United States Patent
Jones, IV et al.

(10) Patent No.: US 6,771,614 B1
(45) Date of Patent: Aug. 3, 2004

(54) WIRELESS POWER CONTROL IN CONJUNCTION WITH A WIRELINE MAC PROTOCOL

(75) Inventors: Vincent K. Jones, IV, Redwood Shores, CA (US); Ali Raissinia, Monte Sereno, CA (US); Gregory G. Raleigh, El Granada, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/348,646

(22) Filed: Jul. 6, 1999

(51) Int. Cl.[7] .......................... H04L 12/413; H04J 3/22
(52) U.S. Cl. ................................ 370/310; 370/469
(58) Field of Search .................. 370/310, 310.1, 370/310.2, 318, 321, 319, 322, 324, 326, 328, 329, 345, 347, 349, 468, 469, 438, 489

(56) References Cited

U.S. PATENT DOCUMENTS

| | | | |
|---|---|---|---|
| 5,056,109 A | | 10/1991 | Gilhousen et al. ............. 375/1 |
| 5,371,734 A | * | 12/1994 | Fischer ....................... 370/311 |
| 5,465,398 A | | 11/1995 | Flammer ..................... 455/69 |
| 5,568,482 A | * | 10/1996 | Li et al. .................. 370/395.1 |
| 5,636,140 A | * | 6/1997 | Lee et al. .................... 370/469 |
| 5,638,371 A | * | 6/1997 | Raychaudhuri et al. .. 370/310.2 |
| 5,886,989 A | * | 3/1999 | Evans et al. ................. 370/346 |
| 5,995,496 A | | 11/1999 | Honkasalo et al. ......... 370/318 |
| 6,052,594 A | * | 4/2000 | Chuang et al. ............. 370/330 |
| 6,065,049 A | * | 5/2000 | Beser et al. ................ 709/218 |
| 6,370,153 B1 | * | 4/2002 | Eng ........................... 370/438 |

OTHER PUBLICATIONS

"Data–over–cable services interface specifications", 1997, Radio Frequency Interface Specification, Cable Television Laboratories.

* cited by examiner

*Primary Examiner*—Wellington Chin
*Assistant Examiner*—William Schultz
(74) *Attorney, Agent, or Firm*—Ritter, Lang & Kaplan LLP

(57) ABSTRACT

Systems and methods for employing digital two-way cable MAC protocols for multi-user wireless communication systems. In one embodiment, a physical layer TDMA framing structure is provided to complement the MAC layer framing. A single MAC layer frame is divided into multiple physical layer frames. The physical layer frames are divided among frames dedicated to transporting data between MAC layer entities and frames dedicated to transporting physical layer control information. Constant delay in transmission through the physical layer is preserved.

24 Claims, 7 Drawing Sheets

WIRELESS POWER CONTROL IN CONJUNCTION WITH A WIRELINE MAC PROTOCOL

STATEMENT OF RELATED APPLICATIONS

The present application is related to the subject-matter of the following co-filed, co-assigned applications.

U.S. Patent App. Ser. No. 09/348,644, REALTIME POWER CONTROL IN OFDM SYSTEMS;

U.S. Patent App. Ser. No. 09/348,647, COMMUNICATION OF PHYSICAL LAYER CONTROL PARAMETERS;

U.S. Patent App. Ser. No. 09/348,719, POWER REGULATION USING MULTI-LOOP CONTROL;

U.S. Patent App. Ser. No. 09/348,645, OPTIMAL USE OF REQUEST ACCESS TDMA SLOTS FOR AUTOMATIC LEVEL CONTROL; and U.S. Patent App. Ser. No. 09/348,727, POLLING FOR TRANSMISSION POWER CONTROL.

All of the related applications are incorporated by reference herein for all purposes.

BACKGROUND OF THE INVENTION

The present invention relates to digital communication systems and more particularly to digital communication systems that employ a medium access control (MAC) protocol to control access to a shared transmission medium.

There exists a great need for broadband access to the Internet and other forms of broadband communication between remote points. Perhaps the ideal medium for broadband communication is optical fiber. Optical fiber has, however, not yet been extended to all, or even a majority of, the businesses and residences that could benefit from broadband services. Other technologies seek to leverage existing infrastructure to deliver broadband connectivity. For example, DSL technology provides broadband services over the copper twisted pair wire that makes up the bulk of local telephone service infrastructure. The applicability of DSL is however limited by distance from the switching office. As this distance increases, available bandwidth decreases until the service becomes entirely unavailable.

Cable systems may also be employed to provide two-way broadband digital communications. Cable systems have been constructed for broadcast television and thus employ a shared transmission medium, coaxial cable, to distribute analog television signals from a head end to a great number of subscribers. In a conventional cable television system, the subscribers only receive and do not transmit. To make use of the cable infrastructure for two-way digital services, one must provide a MAC protocol to prevent subscribers from interfering with one another when transmitting upstream to the head end. One such protocol that has been developed is referred to as the MCNS protocol. The MCNS protocol is described in Data-Over-Cable Service Interface Specifications, Radio Frequency Interface Specification, SP-RFI-I04-980724, (Cable Television Laboratories, 1997), the contents of which are herein incorporated by reference.

Cable systems also do not represent a universal solution to the problem of broadband access. The available transmission medium is physically accessible to many users. If too many users are competing for access to the medium, broadband service may be unavailable to some or all of those requesting it. The limitation of medium availability is particularly important where it is desirable to service businesses that are providing high bandwidth web content to many customers. Also, providing any kind of digital two-way service may require substantial and expensive upgrades to the cable plant to allow for the necessary quality of transmission.

Wireless technology does not require new deployment of wire, cable, or optical fiber and does not depend on the characteristics of existing infrastructure. Wireless is therefore seen as a desirable complement to the other techniques for providing broadband internet access to businesses and residences.

Wireless systems are also, however, constrained by the capacity of a transmission medium common to many users. Typically, on a given frequency, at any one time, only one subscriber or the head end may transmit. Just as with the two-way broadband cable systems, there must be a MAC protocol to control access to the shared medium.

It would be desirable to simply adopt a protocol already developed for cable applications to the wireless context. A cable MAC layer like MCNS is already implemented in low cost chip sets. The operational characteristics of MCNS are well known. Hardware and software to implement higher layer operations has already been designed to interact with MCNS. Furthermore, it is desirable to maintain parts commonality between wireless modems and cable modems to the extent possible.

Unfortunately, the characteristics of the wireless physical layer make it difficult to apply the cable MAC layer protocols without significant modifications that undermine the advantages of using a common protocol for both cable and wireless. MCNS, for example, provides that subscriber units must periodically send data to the head end so that the head end may make a received power measurement. A wireless system requires more frequent power adjustments than a cable system because of the inherent variation over time in the wireless channel response. MCNS, however, requires relatively high processing overhead to make a power measurement at the head end and adjust subscriber unit output power in response. Due to this high processing overhead, it is very difficult to control power in a wireless system controlled by a cable MAC layer protocol such as MCNS.

SUMMARY OF THE INVENTION

Systems and methods for employing digital two-way cable MAC protocols for multi-user wireless communication systems are provided by virtue of the present invention. In one embodiment, a physical layer TDMA framing structure is provided to complement the MAC layer framing. A single MAC layer frame is divided into multiple physical layer frames. The physical layer frames are divided among frames dedicated to transporting data between MAC layer entities and frames dedicated to transporting physical layer control information. Constant delay in transmission through the physical layer is preserved.

A first aspect of the present invention may be applied within a communication system employing a MAC layer. A first node of the communication system includes: a MAC layer processor, and a physical layer control processor that divides a MAC layer transmission frame into a plurality of physical layer frames, and that allocates at least a first one of the physical layer frames to transmission of data originating with the MAC layer processor. The physical layer control processor reserves a second one of the physical layer frames for transmission of physical layer control information by either the first node or another node of the communication system.

A second aspect of the present invention may be applied in a communication system employing a medium access control (MAC) layer. A central access point includes a MAC layer processor that allocates a MAC layer transmission frame to a first subscriber unit, and a physical layer control processor that allocates a first physical layer transmission frame within the MAC layer transmission frame for transmission of MAC layer data by the first subscriber unit, and that allocates a second physical layer transmission frame within the MAC layer transmission frame for transmission of physical layer control information by the first subscriber unit or a second subscriber unit.

A further understanding of the nature and advantages of the inventions herein may be realized by reference to the remaining portions of the specification and the attached drawings.

BRIEF DESCRIPTION OF THE DRAWINGS

The present invention will be readily understood by the following detailed description in conjunction with the accompanying drawings, wherein like reference numerals designate like structural elements, and in which.

DESCRIPTION OF SPECIFIC EMBODIMENTS

Figure 1:
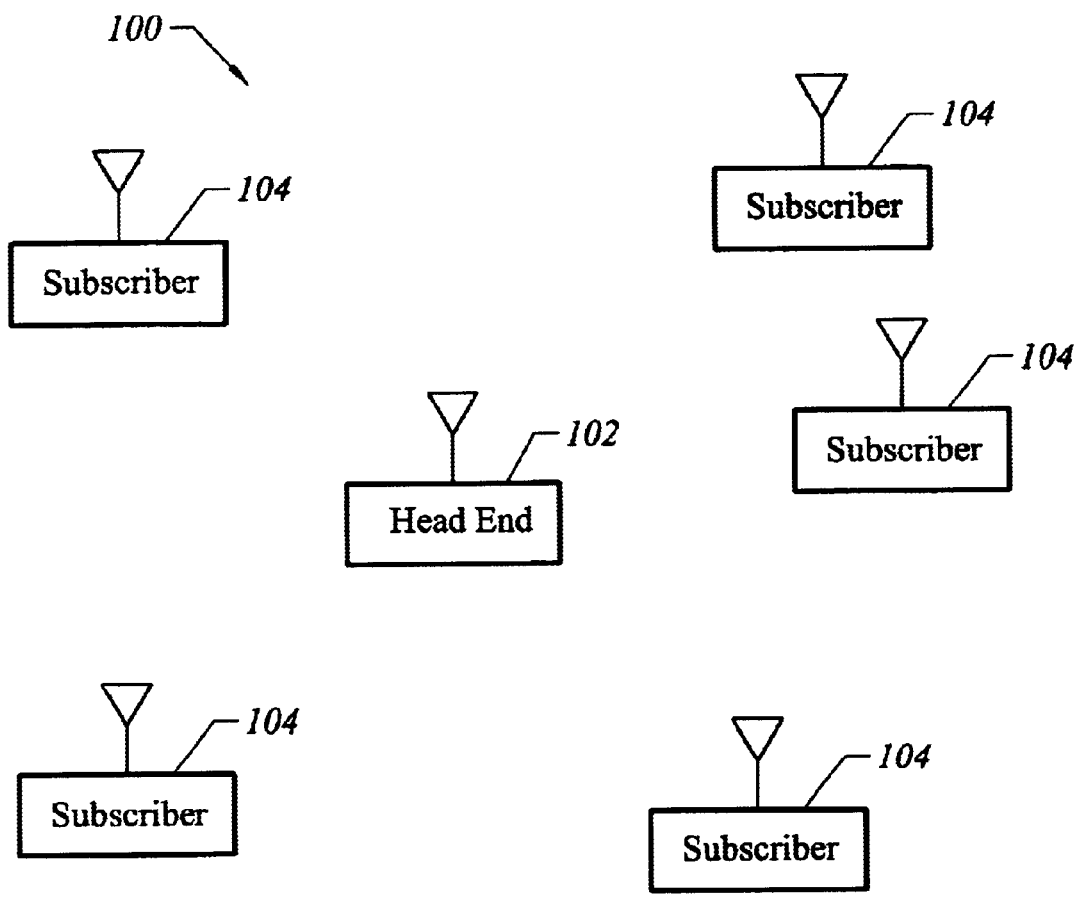
FIG. 1 depicts a point to multipoint network.

FIG. 1 depicts a point to multipoint wireless communication network 100 suitable for implementing one embodiment of the present invention. Network 100 includes a central access point or head end 102 and multiple subscriber units 104. All communication is typically either to or from central access point 102. Communication from central access point 102 to one or more of subscriber units 104 is herein referred to as downstream communication. Communication from any one of subscriber units 104 to central access point 102 is herein referred to as upstream communication. In one embodiment, different frequencies are allocated to upstream and downstream communication. In alternate embodiments, subscriber units 104 may communicate directly with one another.

Each of one or more upstream frequencies is common to multiple subscriber units. To prevent collisions between subscriber units in accessing the shared medium, a medium access control (MAC).protocol is provided. According to one embodiment of the present invention, a MAC protocol intended for data transmission over cable systems is used to coordinate upstream communications in wireless network 100. An exemplary MAC protocol of this type is the so-called MCNS protocol described in the Data-Over-Cable Service Interface Specifications, Radio Frequency Interface Specification, SP-RFI-I04-980724, (Cable Television Laboratories, 1997), the contents of which are herein incorporated by reference.

MCNS employs a time domain multiple access (TDMA) scheme to allocate access to the shared upstream frequency among the multiple subscriber units 104. The scheme is a so-called reservation scheme where subscriber units 104 make requests to central access point 102 for periods of exclusive access to the shared medium. Central access point 102 responds by broadcasting grants of time slots allocated for transmission by particular subscriber units. For purposes of this allocation, time is divided into frames with each frame being an allocable unit of time.

The entities at central access point 102 and subscriber units 104 that coordinate communication according to MCNS are often referred to collectively as the MAC layer. This identifies these entities as collectively representing a layer in a multi-layer communication model. In reference to the well-known OSI multilayer model of data communication, the MAC layer as it discussed here may be understood to be a lowest sublayer of the data link layer. Underneath the MAC layer is the physical layer, which is here responsible for transmitting and receiving bits over the wireless channel.

Figure 2:
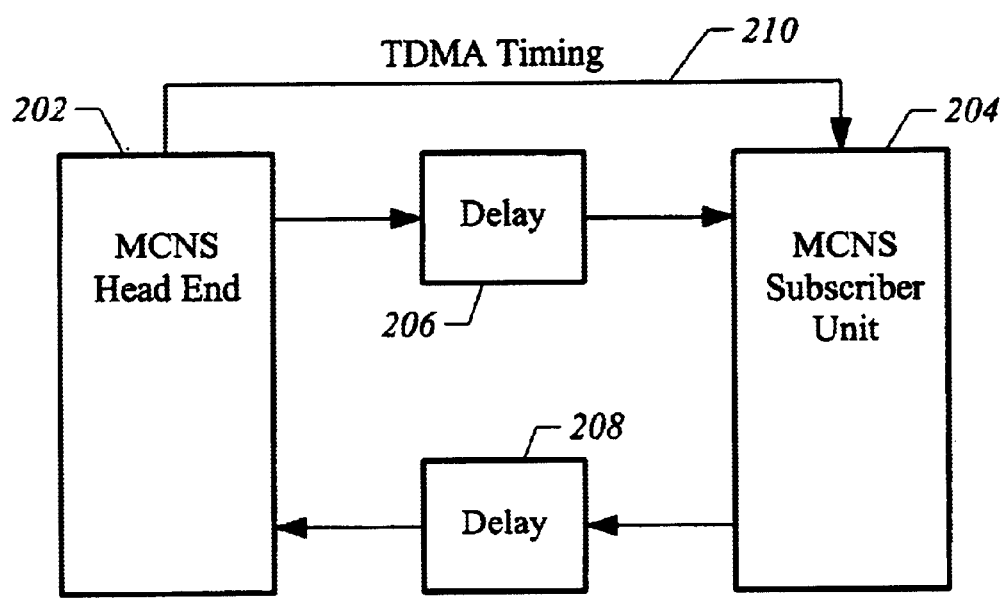
FIG. 2 depicts a simplified conceptual model of operation of the MCNS protocol.

FIG. 2 depicts a simplified conceptual model of operation of the MCNS protocol. A MCNS central access point entity 202 sends and receives data according the MCNS MAC protocol. An MCNS subscriber unit entity 204 represents one of the subscriber unit MAC entities exchanging data with the central access point. The downstream physical layer including the central access point transmitter, subscriber unit receiver, and downstream over-the-air delay is represented as a fixed constant delay 206. The upstream physical layer including the subscriber unit transmitter and over the air delay up until the central access point receiver antenna is represented as a fixed constant delay 208. The data exchanged includes MAC management data and data being transported between entities belonging to higher layers.

In order to implement the TDMA operation of the upstream channel, there must be a shared understanding of system timing between central access point 102 and each subscriber unit 104. Timing is synchronized via a MAC layer process known as ranging. Successive messages from central access point MAC entity 202 to subscriber unit MAC entity 204 occur at periodic intervals and include time stamps representing a current time value at the central access point. Subscriber unit MAC entity 204 adjusts its own clock rate to match the differences in incoming time stamps.

Once clock rate is synchronized, the next step is synchronization of clock phase and establishment of a round trip propagation delay (RTD) value. Central access point MAC entity 202 sends a time stamp message at $T^H$. Subscriber unit MAC entity 204 receives the time stamp and sets its own clock to $T^H$ setting the local clock phase. Subscriber unit MAC entity 204 then transmits a ranging response at a time $T^{S1}$ designated in a message from central access point MAC entity 202. Central access point MAC entity 202 then listens for the ranging response during a time window that is wide enough to take into account the range of possible propagation delays. Central access point MAC entity 202 notes the time of arrival of the ranging response as $T^{H1}$ and computes the RTD to be $T^{H1}-T^{S1}$. This RTD is then sent from central access point entity 202 to subscriber unit MAC entity 204. Subscriber unit entity MAC 204 then always transmits its MAC frames at the time scheduled by central access point MAC entity 202 advanced by RTD. For the ranging process to work and for the resulting RTD value to retain its validity, delays 206 and 208 must remain constant. A timing control line 210 illustrates the fact that central access point entity 202 controls the TDMA timing.

The MAC ranging process is performed upon power-on of subscriber unit 104 or central access point 102. The ranging process is typically also repeated periodically.

Central access point 102 also controls the output power of each subscriber unit 104. In prior art MCNS implementations, this function is performed at the MAC layer. At central access point 102, received power measurements determined within the physical layer are passed from the physical layer to the MAC layer for each of subscriber units 104. Such power measurements may be based on any transmission received from the individual subscriber unit including a ranging request. Central access point MAC entity 202 uses the downstream channel to transmit power adjustment commands to each subscriber unit 104.

Because the ranging process repeats periodically for each subscriber unit regardless of data traffic originating with that subscriber unit, it is useful to base power control on power measurements of upstream ranging responses. In MCNS, processing requirements associated with power control and ranging mean that it is difficult to repeat the ranging process more than every two seconds. This two second interval then dictates the frequency of power measurements on which central access point 102 can base its power adjustment commands. This interval has been found sufficient for power updates in a data over cable system. However, in a wireless system, more frequent updates are required.

Figure 3:
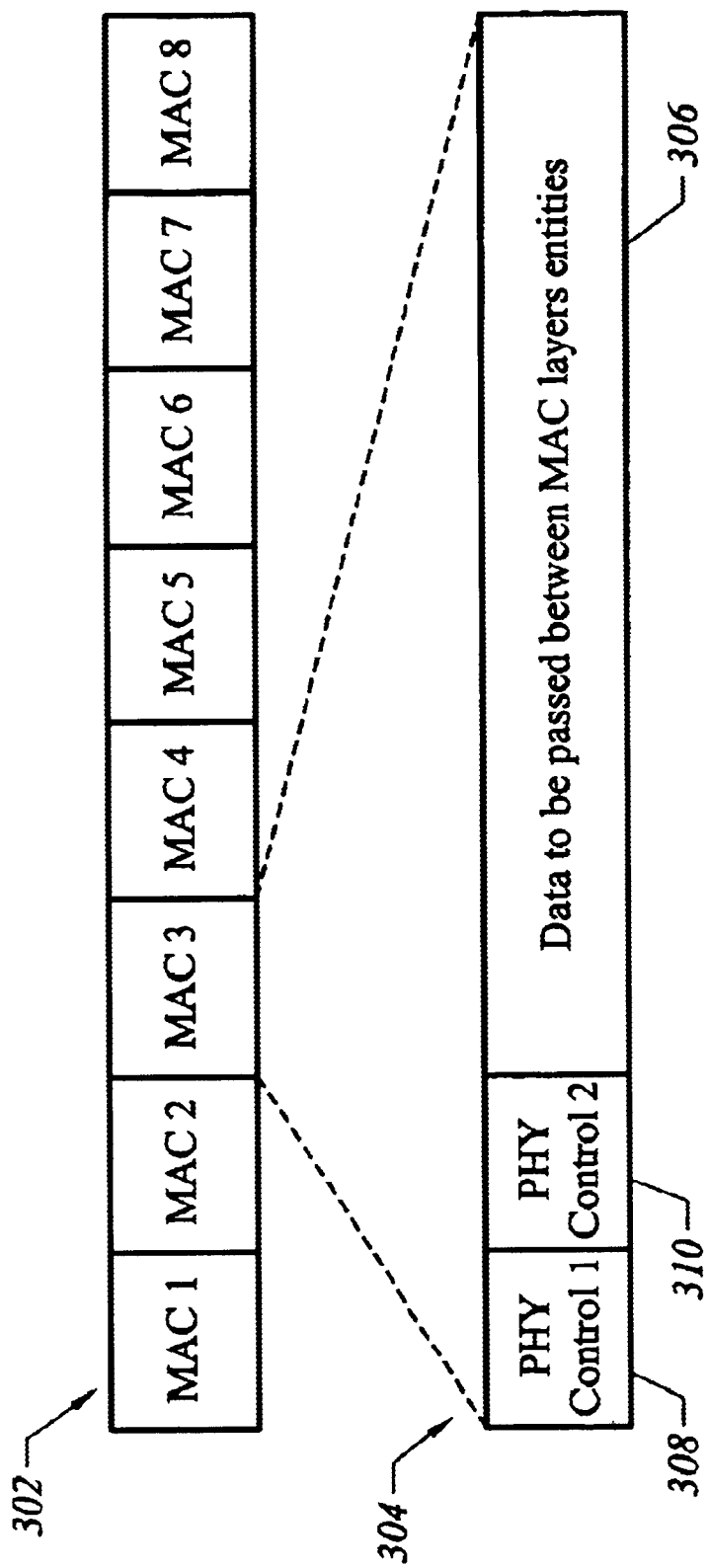
FIG. 3 depicts a combined physical layer/ MAC layer framing structure for upstream communication according to one embodiment of the present invention.

According to the present invention, special upstream power measurement bursts may be transmitted within a physical layer framing scheme that operates within a MAC layer framing scheme. FIG. 3 depicts a combined physical layer/ MAC layer framing structure for upstream communication according to one embodiment of the present invention. A MAC framing structure diagram 302 depicts how the upstream channel is divided in the time domain into frames, each frame being available for transmission particular by a subscriber unit or for receiving ranging requests from any subscriber unit. These frames may also be referred to as minislots.

According to the present invention, some or all of the MAC layer frames may be divided into physical layer frames according to a physical layer framing structure 304. The depicted physical layer frames may be implemented by, e.g., a TDMA (time division multiple access) where each physical layer frame represents a non-overlapping time slot, an FDMA (frequency division multiple access) or OFDM (orthogonal frequency division multiplexing) scheme where each frame represents availability of a particular frequency domain subchannel within the time period mandated by the MAC frame, or a CDMA (code division multiple access) where different physical layer frames represent different spreading codes used to define code domain subchannels available within the MAC frame time period.

The availability of the physical layer framing allows the subscriber unit physical layer system to pass information to the central access point physical layer system in a way that does not interfere with operation of the MAC layer. Within physical layer framing structure 304, a MAC data frame 306 carries the data sent by subscriber unit MAC entity 204 to central access point MAC entity 202. This data referred to herein as MAC data or MAC layer data may include management information relating to operation of the MAC as well as data to be transferred by higher level layers including, voice, video, files, etc. A first physical layer control frame 308 and a second physical layer control frame 310 are available to carry information carried by the physical layer. For example, one of the physical layer control frames could carry a burst for use in measuring received power at central access point 102. The other physical layer control frame could carry, e.g., a ranging request or a message indicating the subscriber's geographic coordinates as determined using the Global Positioning System (GPS).

It is not necessary that each physical layer frame within a MAC layer frame originate within the same subscriber unit. MAC data frame 306 will originate with the subscriber unit designated by operation of the MAC layer for the corresponding MAC frame while the physical layer control frames are transmitted by another subscriber unit or two other subscriber units. This permits power measurement bursts to be transmitted periodically by subscriber units that do not have any data to transmit and much more frequently than required by the operation of the MAC layer alone. Note that the power measurement bursts may then be much shorter than a full MAC frame, allowing sufficiently frequent power measurement updates while preserving link capacity for upstream data transmission.

In order to implement a TDMA physical layer frame structure, the physical layer must also establish a common clock with a clock rate, clock phase, and RTD value. In one embodiment, the clock rate, clock phase, and RTD value established by the MAC layer ranging process are available at the physical layer. The physical layer at central access point 102 obtains its clock rate and clock phase for the entire network from the central access point MAC layer and obtains an RTD value for each of subscriber units 104 through the ranging process. The physical layer at each of subscriber units 104 obtains all of these values from their own MAC layer systems.

If the MAC layer clock provides a clock tick for every MAC frame, then the physical layer clock can be derived from the MAC clock timing and provide a clock tick for every physical layer frame. Thus the physical layer frame clock rate can simply be established as a multiple of the MAC layer frame clock rate.

Certain physical layer control frames may be allocated by reservation. When allocations occur by reservation, physical layer scheduling messages will be transmitted downstream. Techniques for inserting physical layer data into the downstream communication are discussed in the co-filed, co-assigned application entitled DOWNSTREAM COMMUNICATION IN THE PHYSICAL LAYER. To facilitate coordination among central access point 102 and subscriber units 104, it will also be preferable to assign each subscriber unit a physical layer ID.

Many wireline MAC implementations, however, do not make the MAC layer frame clock externally available so that the physical layer at either central access point 102 or subscriber unit 104 can access it. For example, the BCM3300, available from Broadcom, Inc. of Irvine, Calif., may be used to implement subscriber unit MAC layer processing. This integrated circuit does not provide a MAC layer frame clock signal, i.e., a series of impulses corresponding to the beginnings of successive MAC frames.

To operate a time domain physical layer framing structure in conjunction with this type of MAC hardware that does not make the MAC layer frame clock available externally, the physical layer may reconstruct the MAC layer frame clock. In MCNS, downstream data is also divided into frames that are synchronized to the upstream frames. The physical layer at central access point 102 and at each of subscriber units 104 extracts from successive frames, a time counter value. The most significant bits of the time counter value correspond to the lowest significant bits of a MAC layer frame counter value. The rate of change of the counter value is the MAC layer frame clock rate. The remaining high order bits of the MAC layer frame counter value change relatively infrequently and may be recovered by the physical layer by monitoring downstream scheduling messages which give full MAC layer frame counter values to identify scheduled transmission times for individual subscriber units.

With the MAC layer frame counter rate of change established, a MAC layer frame clock signal may now be resynthesized. Also, the MAC layer frame counter value is now also available within the physical layer. An individual physical layer frame may be identified by the MAC layer frame counter value of its MAC layer frame concatenated with a value identifying its position within the MAC layer frame. Each physical layer frame begins a predetermined time interval after the reconstructed MAC layer frame clock pulse that begins its MAC layer clock frame. With the Broadcom integrated circuit, the RTD value may be retrieved and transferred to physical layer hardware.

Various kinds of traffic employ physical layer control frames 308 and 310. There may be power measurement bursts from particular subscriber units. These bursts or other upstream transmissions of physical layer control information may occur at the request of central access point 102. Individual subscriber units may also request one or more physical layer control frames for upstream transmission of physical layer control information. Certain ones of physical layer control frames 308 and 310 are reserved for such physical layer access requests. Downstream physical layer scheduling messages identify which subscriber units are to transmit in which physical layer frames. These physical layer scheduling messages are transmitted using the techniques of the patent application entitled DOWNSTREAM COMMUNICATION IN THE PHYSICAL LAYER.

Collisions may occur in the access request frames. In response to a detected collision each subscriber unit will wait for a randomly selected time interval before attempting retransmission. The time interval is selected locally at each subscriber unit within a range selected by the central access point. The range value is transmitted downstream to each subscriber unit within the scheduling message.

The processors implementing the MAC layer are programmable with the overhead imposed by the physical layer so that they know how much data from the MAC layer and above may be inserted into each MAC frame. In prior art systems, this physical layer overhead is used for redundancy added by error correction coding, and for other physical layer functions. Here, the overhead should also include the amount of data from the MAC layer and above that is displaced by physical layer control frames 308 and 310.

Figure 4A:
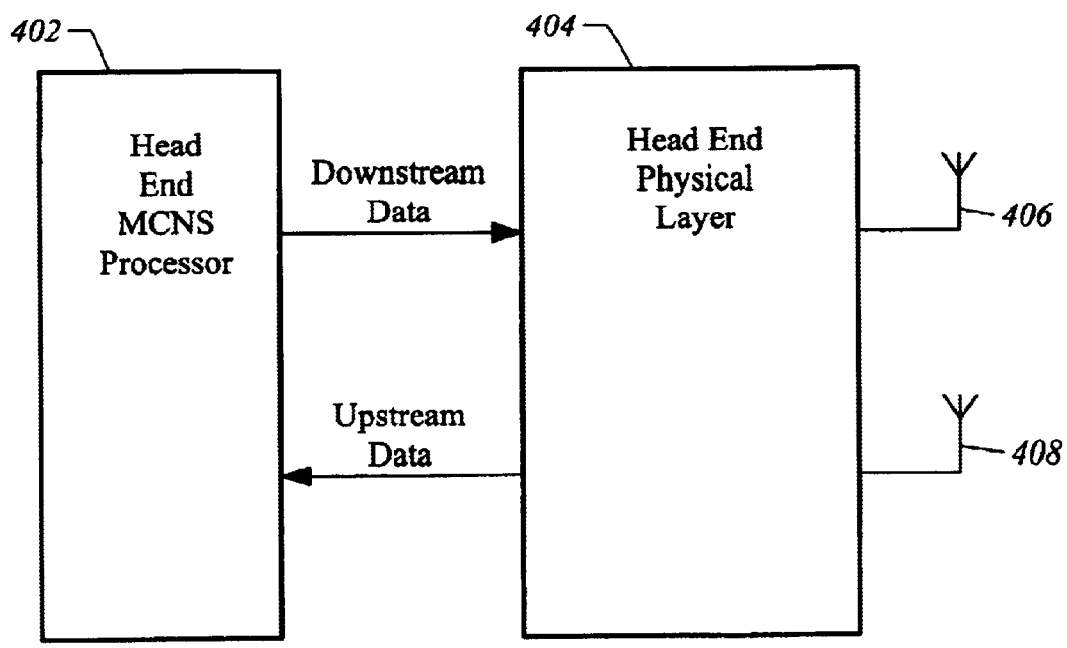
FIG. 4A depicts a combination of a physical layer processor and MAC layer processor for use in a central access point according to one embodiment of the present invention.

FIG. 4A is a top level view of physical and MAC layer operation at central access point 102 according to one embodiment of the present invention. In the depicted embodiment, the MAC is MCNS and a central access point MCNS processor 402 performs central access point MAC functions. An example of a central access point MCNS processor is the BCM3210B integrated circuit available from Broadcom. A central access point physical layer block 404 represents all of the physical layer functions that are described in greater detail with reference to FIG. 4B. Downstream MAC data is sent from central access point MCNS processor 402 to central access point physical layer block 404 for transmission via a transmitter antenna 406.

Upstream data for the MAC layer and higher layers is received via a receiver antenna 408 and forwarded to MCNS processor 402. Physical layer block 404 also transmits and receives physical layer control information via the antennas and processes it internally, transparently to the MAC layer. Although two antennas are depicted, a single antenna may be employed in conjunction with a diplexer or switch.

Figure 4B:
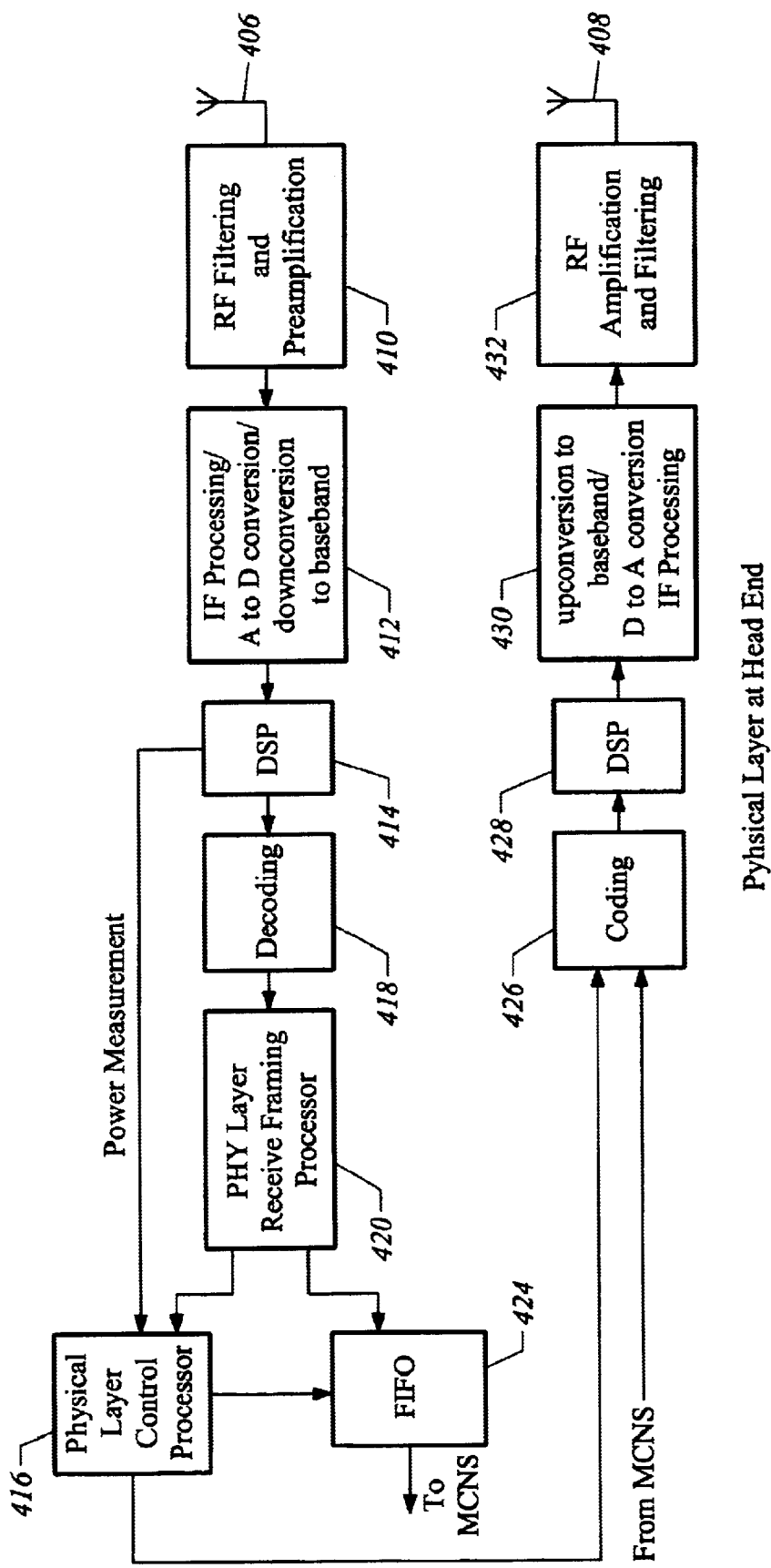
FIG. 4B depicts functional units implementing physical layer operation at a central access point according to one embodiment of the present invention.

FIG. 4B depicts further details of physical layer operation according to one embodiment of the present invention. Upstream signals are received via antenna 406 and processed by an RF block 410 which performs filtering at the RF frequency and low noise preamplification. An IF block 412 downconverts the RF signal to an IF frequency, filters at the IF frequency, downconverts the IF signal to baseband and converts the analog baseband signal to a sequence of digital samples. Further signal processing including demodulation, channel estimation, equalization, etc., is performed by a DSP block 414. DSP block 414 may also measure the power of selected received signals and forward the power measurement to a physical layer control processor 416. A decoding block 418 removes the effects of error correction coding, e.g., Reed-Solomon coding, convolutional coding, trellis coding, etc. and outputs decoded data.

The decoded data is forwarded to a physical layer receive framing processor 420. Physical layer receive framing processor 420 is aware of the boundaries between physical layer frames and forwards physical layer control data to a physical layer control processor 416. Physical layer receive framing processor 420 forwards MAC data to a FIFO 424. Data is read out of FIFO 424 to central access point MCNS processor 402.

Downstream MAC data is input to a coding block 426 which applies error correction coding. Downstream physical layer control data generated by physical layer control processor 422 is also input to coding block 426. Modulation is applied to the coded signal by a DSP block 428. An IF block 430 converts the baseband digital signal to analog, upconverts the analog signal to an IF frequency, filters the IF signal and upconverts to an RF frequency. An RF block 432 performs further filtering and RF amplification prior to transmission via antenna 408.

Physical layer control processor 416 generates physical layer scheduling messages, range values for physical layer post-collision delays, and any other information to be sent downstream to coordinate the upstream transmission of physical layer control information or control subscriber unit power level. Physical layer control processor 416 receives power measurements for the various subscriber units and generates the power control commands based on these measurements. Physical layer control processor 416 also determines physical layer timing as described above.

Figure 5A:
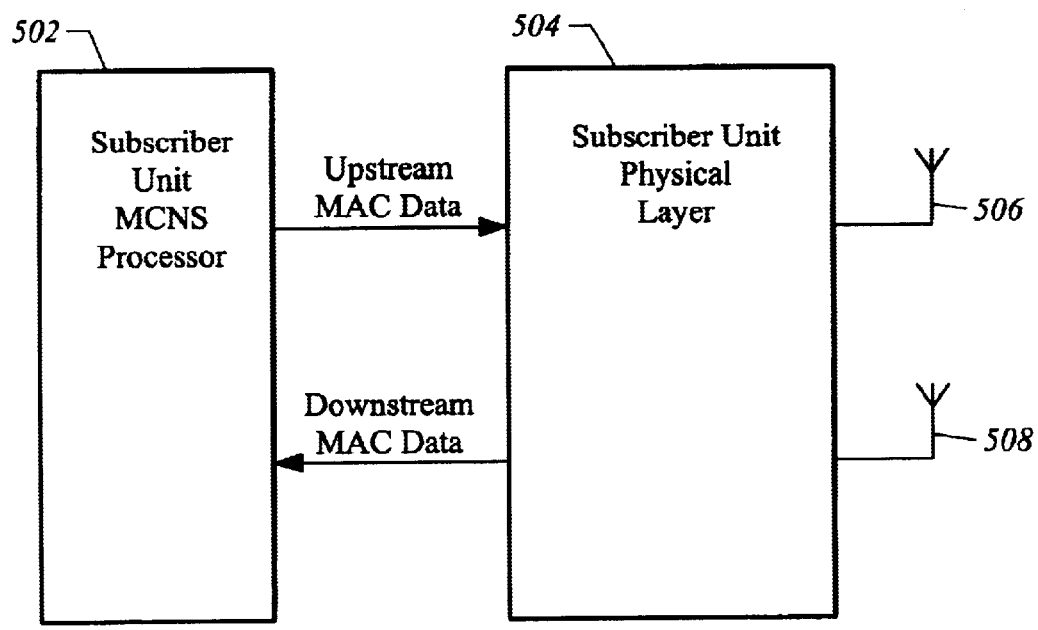
FIG. 5A depicts a combination of a physical layer processor and MAC layer processor for use in a subscriber unit according to one embodiment of the present invention.

FIG. 5A is a top level view of physical and MAC layer operation at subscriber unit 104 according to one embodiment of the present invention. A subscriber unit MCNS processor 502 performs the MAC-related functions in one embodiment. An example of such a subscriber unit MCNS processor is the BCM3300 available from Broadcom. A subscriber unit physical layer block 504 represents all of the physical layer functions that are described in greater detail with reference to FIG. 5B. Upstream data for the MAC layer and higher layers is sent from subscriber unit MCNS processor 502 to subscriber unit physical layer block 504 for transmission via a transmitter antenna 506.

Downstream data is received via a receiver antenna 508. Downstream data for the MAC layer and higher layers is forwarded to MCNS processor 502. Physical layer block 504 also transmits and receives physical layer control information via the antennas and processes it internally. As with central access point 102, although two antennas are depicted, a single antenna may be employed in conjunction with a diplexer or switch.

Figure 5B:
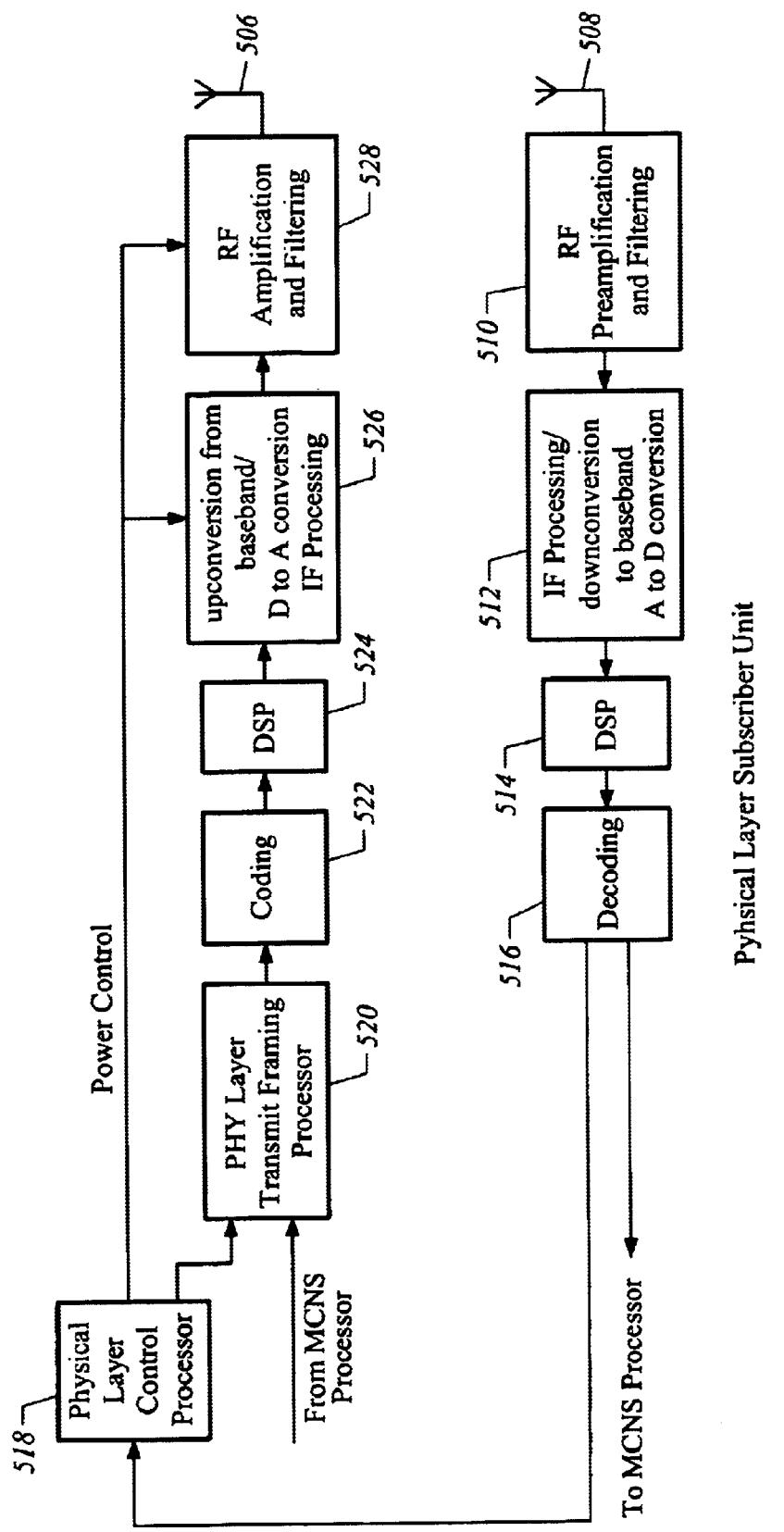
FIG. 5B depicts functional units implementing physical layer operation at a subscriber unit according to one embodiment of the present invention.

FIG. 5B depicts details of physical layer block 504. Downstream signals are received via receiver antenna 508 and subject to RF processing by an RF block 510. RF block 510 performs RF preamplification and filtering. An IF block 512 downconverts the RF signal to an IF frequency, filters the IF signal, downconverts the IF signal to baseband and converts the baseband signal to a digital signal. A DSP block 514 performs further filtering and other signal processing on the baseband digital signals including demodulation, channel estimation, interference processing, etc. A decoding block 516 decodes the digital signal in accordance with any error correction coding scheme that has been applied. Most of the output of decoding block 516 is MAC and higher layer data which is forwarded to MCNS subscriber unit processor 502. Some of the decoded data is physical layer control data, e.g., power level control commands, physical layer scheduling information, etc. which is forwarded to a physical layer control processor 518. Physical layer control processor also receives MAC time stamp messages to facilitate the development the development of physical layer timing.

On the upstream, physical layer control processor 518 generates upstream physical layer information including, e.g., power measurement bursts, etc. This information, as well as information concerning the scheduling of upstream physical layer transmissions is forwarded to a physical layer transmit framing processor 520. Physical layer transmit framing processor 520 also receives upstream MAC and higher layer data from MCNS subscriber unit processor 502 as well as MAC instructions as when to transmit according to the MCNS protocol. Physical layer transmit framing processor forms physical layer frames according to FIG. 3 and fills the frames with the appropriate physical layer control or MAC data. A coding block 522 performs channel coding on the framed data to be transmitted. A DSP block 524 performs further baseband filtering and other signal processing on the coded data. An IF block 526 converts the digital baseband signal to analog, converts the analog signal to IF, filters the IF signal, and converts the IF signal to an RF signal. An RF block 528 filters and amplifies the RF signal for transmission via antenna 506. The amplification level within both IF block 526 and RF block 528 is controlled by physical layer control processor 518 and adjusted under the control of central access point 102.

It is understood that the examples and embodiments described herein are for illustrative purposes only and that various modifications or changes in light thereof will be suggested to persons skilled in the art and are to be included within the spirit and purview of this application and scope of the appended claims. For example, the present invention may be applied to wireline systems. All publications, patents, and patent applications cited herein are hereby incorporated by reference.

What is claimed is:

1. In a communication system employing a medium access control layer, a method for operating a subscriber unit comprising:
    passing data from a subscriber unit MAC layer processor to a subscriber unit physical layer control processor;
    dividing a MAC layer transmission frame allocated to said subscriber unit for transmission into a plurality of portions; and
    using at least a first one of said portions for transmission of said data and reserving a second one of said portions for transmission of physical layer control information by another subscriber unit of said communication system; and
    wherein said communication system comprises a wireless communication system.

2. The method of claim 1 further comprising:
    transmitting said data from said subscriber unit to a central access point in said first one of said portions.

3. The method of claim 1 wherein said physical layer control information comprises a power measurement burst.

4. The method of claim 1 wherein said portions comprise physical layer frames.

5. The method of claim 4 wherein said physical layer control information comprises a request to transmit further control information in one or more physical layer frames.

6. In a communication system employing a central access point, a method for receiving control information comprising:
    at said central access point, allocating a MAC layer transmission frame to a first subscriber unit;
    at said central access point, allocating a first portion of said MAC layer transmission frame for transmission of MAC layer data by said first subscriber unit;
    at said central access point, allocating a second portion of said MAC layer transmission frame for transmission of physical layer control information by a second subscriber unit; and
    wherein said physical layer control information comprises samples facilitating a measurement of received power.

7. The method of claim 6 wherein said first and second portions comprise physical layer transmission frames.

8. The method of claim 6 wherein allocating said MAC layer transmission frame is performed by a MAC layer processor within said central access point.

9. The method of claim 8 further comprising:
    at said central access point, receiving said MAC layer data from said first subscriber unit; and
    transferring said MAC layer data to said MAC layer processor.

10. In a communication system employing a medium access control (MAC) layer, a subscriber unit of said communication system comprising:
    a MAC layer processor; and
    a physical layer control processor that divides a MAC layer transmission frame into a plurality of portions, and that employs at least a first one of said portions for transmission of data received from said MAC layer processor and reserves a second one of said portions for transmission of physical layer control information to another subscriber unit of said communication system; and
    wherein said communication system comprises a wireless communication system.

11. The subscriber unit of claim 10 further comprising:
    a transmitter that transmits said data from said subscriber unit to said central access point according to said allocation.

12. The subscriber unit of claim 10 wherein said physical layer control information comprises a power measurement burst.

13. The subscriber unit of claim 10 wherein said MAC layer processor comprises an MCNS processor.

14. The subscriber unit of claim 10 wherein said portions comprise physical layer frames.

15. The subscriber unit of claim 14 wherein said physical layer control information comprises a request to transmit further control information in one or more physical layer frames.

16. In a communication system employing a medium access control (MAC) layer, a central access point comprising:
- a MAC layer processor that allocates a MAC layer transmission frame to a first subscriber unit; and
- a physical layer control processor that allocates a first portion of said MAC layer transmission frame for transmission of MAC layer data by said first subscriber unit, and that allocates a second portion of said MAC layer transmission frame for transmission of physical layer control information by a second subscriber unit; and
- wherein said physical layer control information comprises samples facilitating a measurement of received power.

17. The central access point of claim 16 wherein said portions comprise physical layer frames.

18. The central access point of claim 17 wherein said physical layer control information comprises a request to transmit further control information in a physical layer frame.

19. In a communication system employing a medium access control layer, a method for operating a subscriber unit comprising:
- passing data from a subscriber unit MAC layer processor to a subscriber unit physical layer control processor;
- dividing a MAC layer transmission frame allocated to said subscriber unit for transmission into a plurality of portions; and
- using at least a first one of said portions for transmission of said data and reserving a second one of said portions for transmission of physical layer control information by another subscriber unit of said communication system; and
- wherein said physical layer control information comprises samples facilitating a measurement of received power.

20. In a communication system employing a medium access control (MAC) layer, a subscriber unit of said communication system comprising:
- a MAC layer processor; and
- a physical layer control processor that divides a MAC layer transmission frame into a plurality of portions, and that employs at least a first one of said portions for transmission of data received from said MAC layer processor and reserves a second one of said portions for transmission of physical layer control information to another subscriber unit of said communication system; and
- wherein said physical layer control information comprises a power measurement burst.

21. In a communication system employing a medium access control (MAC) layer, a subscriber unit of said communication system comprising:
- a MAC layer processor; and
- a physical layer control processor that divides a MAC layer transmission frame into a plurality of portions, and that employs at least a first one of said portions for transmission of data received from said MAC layer processor and reserves a second one of said portions for transmission of physical layer control information to another subscriber unit of said communication system; and
- wherein said MAC layer processor comprises an MCNS processor.

22. In a communication system employing a medium access control layer, apparatus for operating a subscriber unit comprising:
- means for passing data from a subscriber unit MAC layer processor to a subscriber unit physical layer control processor;
- means for dividing a MAC layer transmission frame allocated to said subscriber unit for transmission into a plurality of portions; and
- means for using at least a first one of said portions for transmission of said data and reserving a second one of said portions for transmission of physical layer control information by another subscriber unit of said communication system; and
- wherein said communication system comprises a wireless communication system.

23. In a communication system employing a medium access control layer, apparatus for operating a subscriber unit comprising:
- means for passing data from a subscriber unit MAC layer processor to a subscriber unit physical layer control processor;
- means for dividing a MAC layer transmission frame allocated to said subscriber unit for transmission into a plurality of portions; and
- means for using at least a first one of said portions for transmission of said data and reserving a second one of said portions for transmission of physical layer control information by another subscriber unit of said communication system; and
- wherein said physical layer control information comprises samples facilitating a measurement of received power.

24. In a communication system employing a central access point, apparatus for receiving control information, said apparatus comprising:
- means for, at said central access point, allocating a MAC layer transmission frame to a first subscriber unit;
- means for, at said central access point, allocating a first portion of said MAC layer transmission frame for transmission of MAC layer data by said first subscriber unit;
- means for, at said central access point, allocating a second portion of said MAC layer transmission frame for transmission of physical layer control information by a second subscriber unit; and
- wherein said physical layer control information comprises samples facilitating a measurement of received power.

* * * * *